(12) United States Patent
Zuber

(10) Patent No.: US 6,779,009 B1
(45) Date of Patent: Aug. 17, 2004

(54) ENHANCED TIME-SHARED DATA CORRELATOR ARCHITECTURE AND METHOD

(75) Inventor: Eric O. Zuber, South Amana, IA (US)

(73) Assignee: Rockwell Collins, Cedar Rapids, IA (US)

( * ) Notice: Subject to any disclaimer, the term of this patent is extended or adjusted under 35 U.S.C. 154(b) by 632 days.

(21) Appl. No.: 09/862,129

(22) Filed: May 21, 2001

(51) Int. Cl.⁷ .............................................. G06F 17/15
(52) U.S. Cl. ...................................... 708/422; 708/425
(58) Field of Search .............................. 708/300, 301, 708/316, 315, 319, 420, 421, 422, 423, 424, 425, 426

(56) References Cited

U.S. PATENT DOCUMENTS 3,831,013 A * 8/1974 Alsup et al. ................ 708/425
4,400,790 A * 8/1983 Chambers et al. ............. 708/5
4,404,645 A * 9/1983 Elings et al. ............... 708/426

* cited by examiner

Primary Examiner—Chuong Dinh Ngo
(74) Attorney, Agent, or Firm—Nathan O. Jensen; Kyle Eppele

(57) ABSTRACT

An enhanced architecture time-shared data correlator for performing a predetermined number of correlation processes. A data shift register receives input data and loads the input data. A reference shift register receives reference data and loads and circulates the reference data. A pulse correlator connected to the shift register and the reference shift register correlates the input data with the corresponding reference data and provides a pulse correlator output. An accumulator connected to the pulse correlator receives and adds the pulse correlator outputs from the correlation processes to produce a correlator output corresponding to the predetermined number of correlation processes.

14 Claims, 9 Drawing Sheets

ENHANCED TIME-SHARED DATA CORRELATOR ARCHITECTURE AND METHOD

BACKGROUND OF THE INVENTION

This invention relates to military anti-jam communications systems, frequency hopping communications systems, and more specifically to frequency hopping synchronizing systems and correlators.

High performance anti-jam military radios such as Link-16, also referred to as JTIDS (Joint Tactical Information Distribution System), have multiple users communicating in a time-division multiple access structure employing direct sequence and frequency hopping anti-jam techniques. These radios have the requirement to acquire timing synchronization for each message. In Link-16, this is accomplished via a burst of 32 synchronization pulses in a synchronization preamble preceding message data pulses. The content of each synchronization pulse is a cryptographically derived code word for a particular time slot and sync pulse. A receiver knows the sync pattern a-priori and configures a correlator to search for the pattern and to correlate. The 32 synchronization pulses are equally spread out over a group of eight frequencies of the 51 frequencies used for frequency hopping in the L-band frequency range. The same eight frequencies are not always used and change in a predetermined manner. With 32 synchronization pulses and eight frequencies, four pulses randomly occur at the same frequency as do all other frequencies in the group of eight frequencies. Typical Link-16 systems correlate on 8 or 16 of the 32 sync pulses and must do so uniquely for each antenna, resulting in 16 to 32 pulse correlation processes running in parallel.

First generation Link-16 products implement the correlation processes with 16 or 32 separate pulse correlators resulting in a very high gate count solution. Second generation Link-16 products use time-shared pulse correlators running at a higher clock frequency than the separate correlator implementation to reduce the overall gate count. This second-generation approach allows each correlator hardware block to perform up to four correlation processes. The number of pulse correlators that can be time-shared in a single hardware block is limited by the maximum clock frequency of the design. As device speeds increase with improvements in technology, the multiplexing architecture used to switch the reference and data inputs to the shared correlator block becomes critical in terms of both speed and size. The existing second-generation approach is still inefficient in both areas and also scales very poorly to higher levels of parallelism.

What is needed is a correlator architecture that can be efficiently implemented in terms of both gate count (size) and maximum clock frequency (speed) and also scales well to higher levels of parallelism.

SUMMARY OF THE INVENTION

An enhanced architecture time-shared data correlator for performing a predetermined number of correlation processes is disclosed. The data correlator comprises a data shift register with a predetermined number of input lines for receiving a predetermined number of input data code words of length N at an input data rate R and loading the input data code words at a multiple of the input data rate. The data correlator further comprises a reference shift register for receiving a predetermined number of reference data code words of length N and loading the reference data code words at the multiple of the input data rate. A pulse correlator of length N is connected to the data shift register and the reference shift register for correlating each of the predetermined number of input data code word with its corresponding reference data code word at the multiple of the input data rate to provide a predetermined number of correlation outputs. An accumulator is connected to the pulse correlator for receiving and adding the predetermined number of correlation outputs in accordance with a load/add control signal at a multiple of the input data rate to provide a correlator output. The enhanced architecture time-shared data correlator of claim 1 wherein the predetermined number of correlation processes equals the predetermined number of input data code words. In the enhanced architecture time-shared data correlator, the predetermined number of correlation processes equals the multiple of the input data rate and the predetermined number of reference data code words. In the enhanced architecture time-shared data correlator the data shift register may be a shift register of length 2(N+1)R. The reference shift register comprises N individual shift registers of a length equal to the predetermined number of correlation processes.

It is an object of the present invention to provide an enhanced time-shared data correlator architecture for use in high performance Link-16 synchronization applications.

It is an advantage of the present invention to provide an enhanced time-shared data correlator architecture that reduces gate count and increases clock rate.

BRIEF DESCRIPTION OF THE DRAWINGS

The invention may be more fully understood by reading the following description of the preferred embodiments of the invention in conjunction with the appended drawings wherein.

DETAILED DESCRIPTION

The Joint Tactical Information Distribution System (JTIDS) or Link-16 is a time division multiple access (TDMA) communications system operating in the L-band frequency range. JTIDS provides jam-resistant digital communication of data and voice for command and control, navigation, relative positioning, and identification. To achieve jam resistance, JTIDS employs both direct sequence spread spectrum and frequency hopping techniques.

Figure 1:
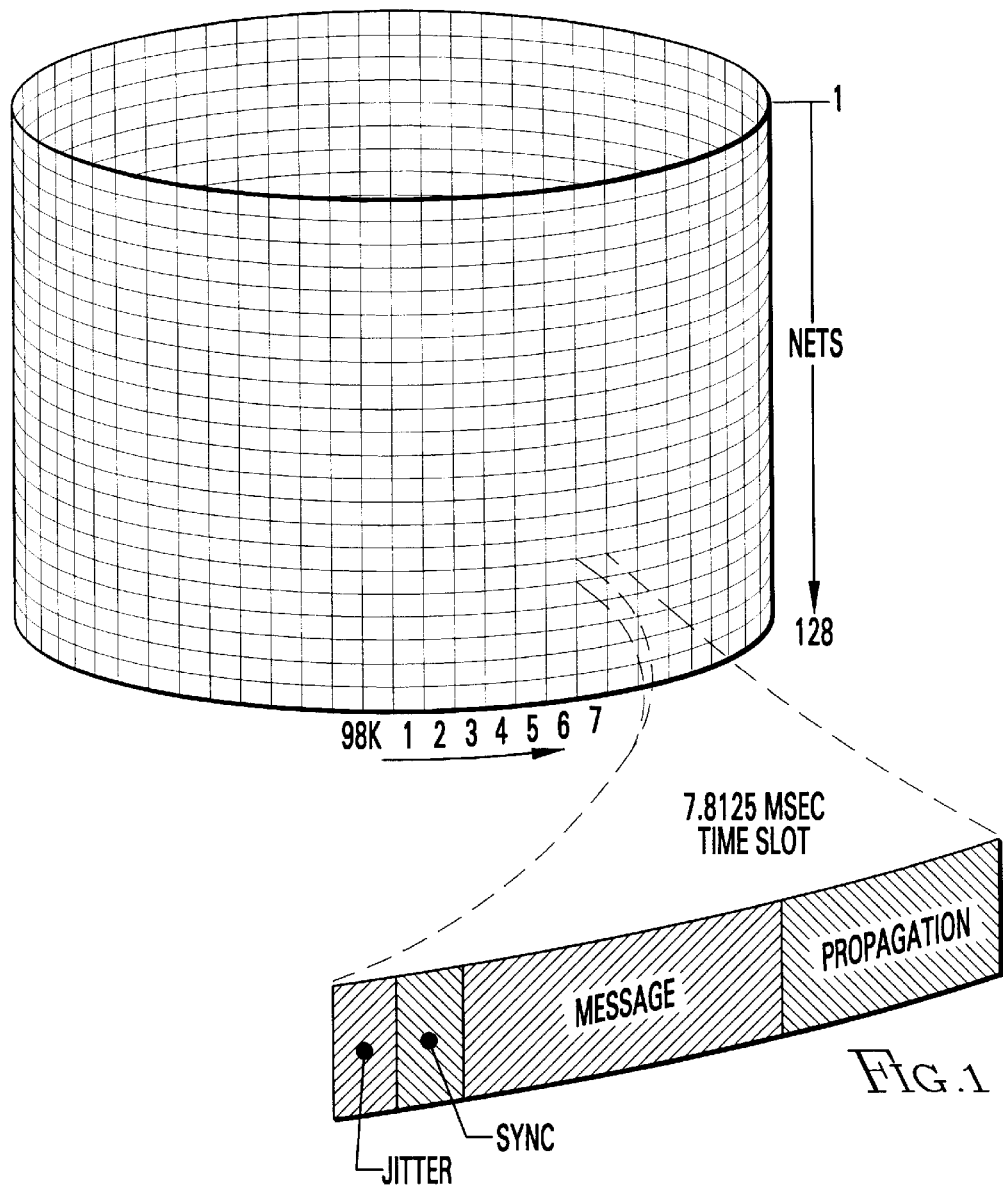
FIG. 1 is a diagram showing the time division multiple access JTIDS system architecture.

JTIDS operates on the principle of time sharing the same randomly hopped frequencies as other subscribers within a communications net. To accomplish this, a time cycle or epoch is established in which time slots are repeated every 12.8 minutes. The time slot structure is shown in FIG. 1. The epoch is divided into 98304 individual time slots of 7.8125 milliseconds each thus providing 128 time slots per second for the transmission or reception of data.

Each subscriber terminal is assigned selected time slots for transmission based on the subscriber's needs. Each subscriber terminal is able to receive in all time slots that it has not been assigned to transmit. A subscriber terminal may have more than one time slot either consecutive or spaced within an epoch. A subscriber may share other nets by being programmed to operate in that net with a different frequency hopping scheme. One subscriber terminal is designated to serve as the time reference, synchronizing the time base of the terminals operating within the net to the same time. Any terminal can serve as the time reference.

Figure 2:
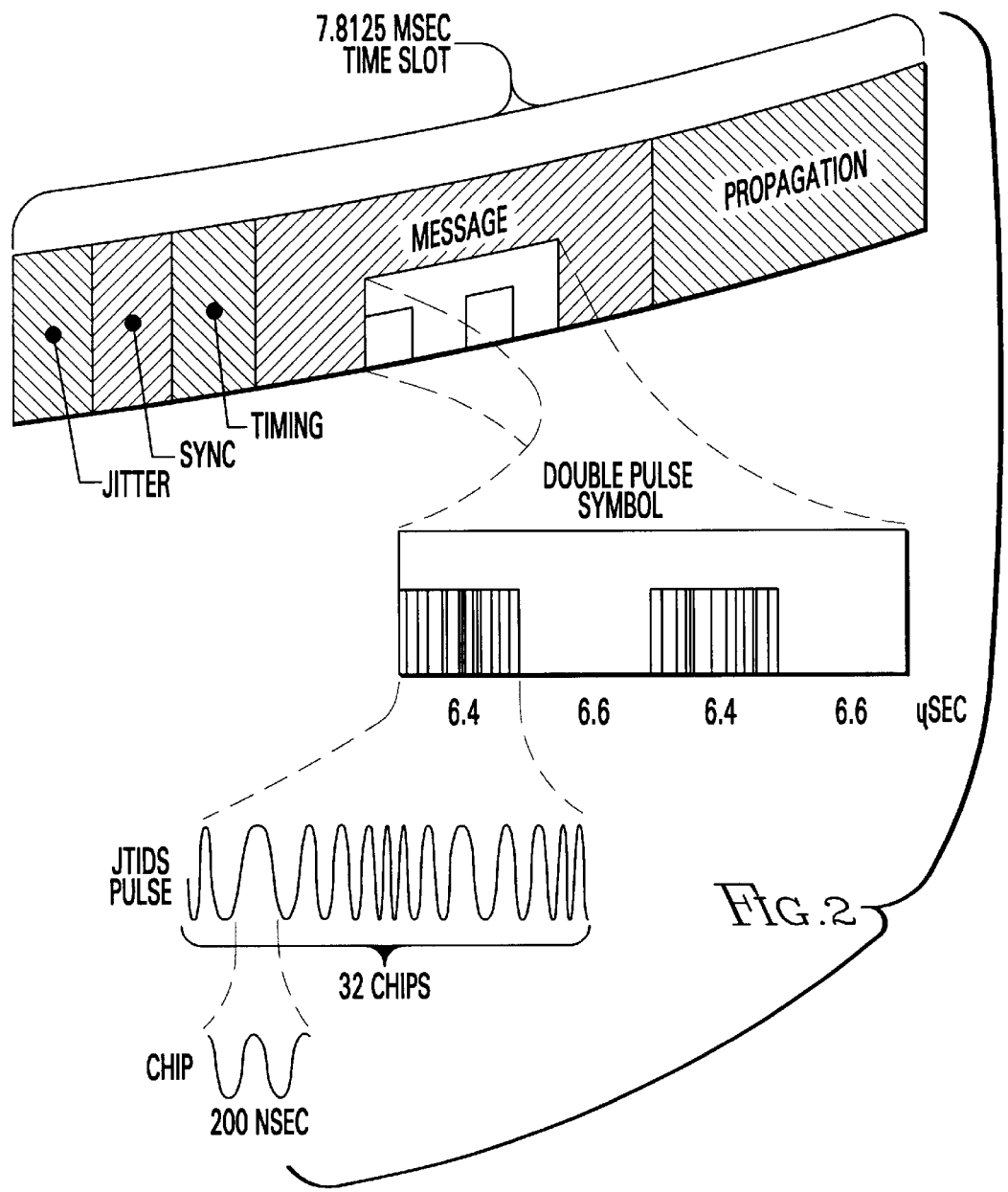
FIG. 2 is a diagram showing the signal structure of a JTIDS time slot.

In each of the 7.8125-millisecond time slots, either 258 or 444 pulses are transmitted each at a different frequency in a pseudorandom frequency-hopping pattern. The 7.8125-millisecond time slot is divided into a variable start interval (jitter), synchronization preamble and time refinement pulses, message pulses, and propagation time period as shown in FIG. 2. The synchronization preamble contains 32 synchronization pulses with a cryptographically derived code word transmitted in each pulse. A receiver knows the sync pattern a-priori and configures a correlator to search for the sync pattern and to correlate with the code words. The 32 synchronization pulses are equally spread over a group of eight frequencies of the 51 frequencies used for frequency hopping. The same eight frequencies are not always used and change in a predetermined manner. With 32 synchronization pulses and eight frequencies, four pulses randomly occur at the same frequency as do all other frequencies in the group of eight frequencies. Typical Link-16 systems correlate on 8 or 16 of the 32 data pulses and must do so uniquely for each antenna in a two-antenna aircraft installation, resulting in 16 to 32 pulse correlation processes.

The pulses are organized in a symbol signal structure as shown in FIG. 2. Each symbol carries five bits of information in either one 6.4-microsecond pulse in a 13-microsecond symbol or two pulses in a 26-microsecond symbol. In the 26-microsecond symbol, both pulses contain the same five bits of data. The five bits of each pulse are represented by a 32-chip cyclic code shift keying (CCSK) pattern obtained from cyclic permutations of a 32-bit pseudorandom pattern. The transmitted pulse is continuous phase shift modulated (CPSM) at a 5-MHz rate by the 32-chip code resulting in the direct sequence spread spectrum signal at a 5-MHz chipping rate.

Figure 3:
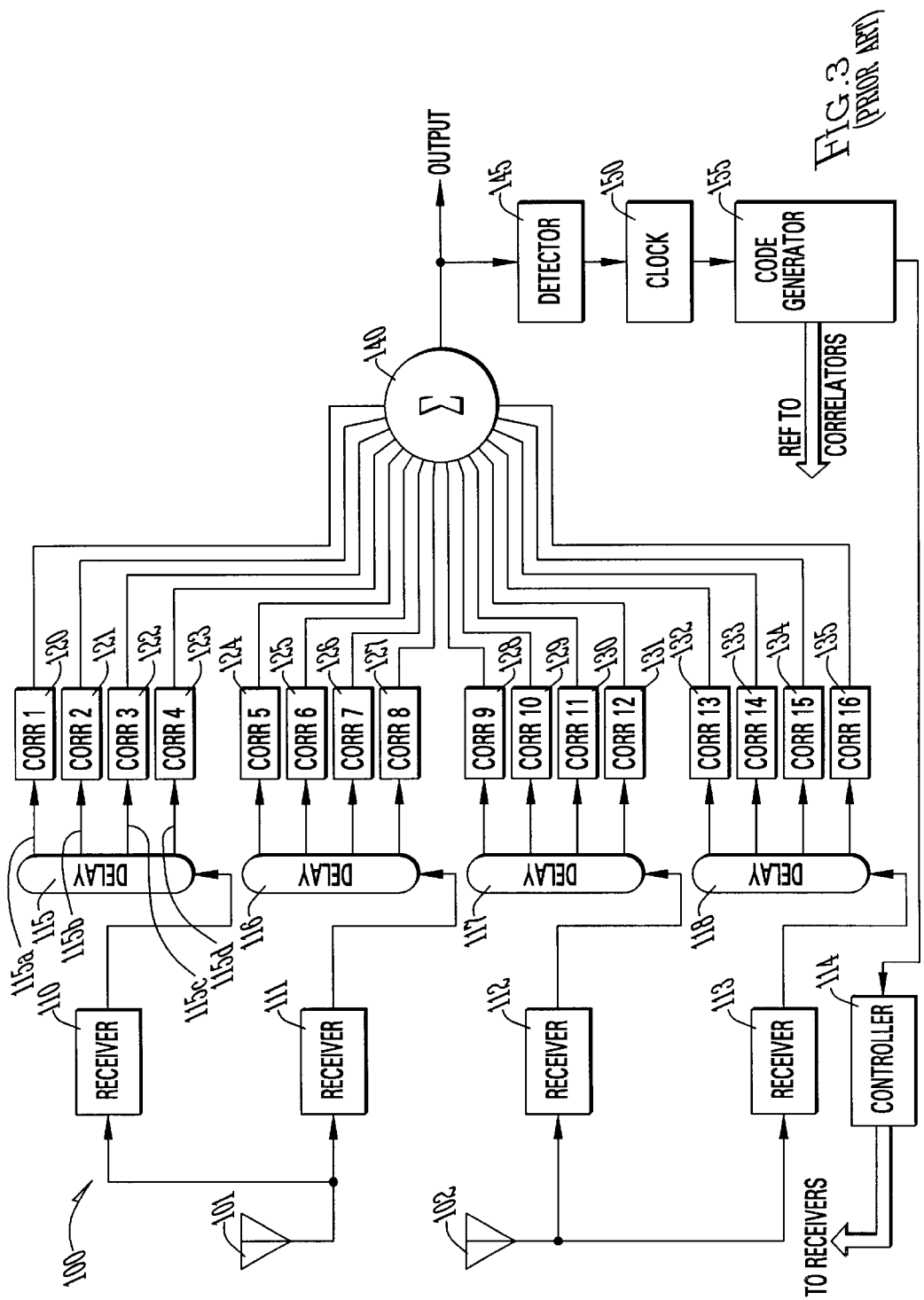
FIG. 3 is a block diagram of a typical prior art JTIDS receiving system.

A prior art Link-16 (JTIDS) receiver 100 is shown in FIG. 3 that implements the correlation processes with multiple separate hardware correlators 120–135. In the receiver 100, two antennas 101 and 102 may be used in an aircraft installation with one antenna mounted on top and one on the bottom of the aircraft fuselage to receive a Link-16 signal from a transmitter (not shown). The signals from the antennas 101 and 102 are passed to a bank of four receivers 110–113 with antenna 101 connected to receivers 110 and 111 and antenna 102 connected to receivers 112 and 113. The receivers 110–113 frequency hop during the sync preamble and data dwells in accordance with a predetermined frequency-hopping pattern controlled by a controller 114 and a code generator 155. The controller 114 and code generator 155 may be implemented in software in a microprocessor.

The outputs of the receivers 110–113 are connected to tapped delay lines 115–118 as shown in FIG. 3. Tapped delay line 115 is connected to receiver 110 and has four taps 115a–115d connected to correlators 120–123. The outputs of the correlators 120–123 are connected to a summing function 140. Likewise tapped delay lines 116, 117 and 118 are connected to receivers 111, 112, and 113 and have their taps connected to correlators 124–135 and the correlators 124–135 have their outputs connected to the summing function 140.

The output of the summing function 140 is connected to a detector function 145 that determines if a threshold level is reached and generates a clock correction signal that is fed to the clock 150. The summing function 140 and the detector function may be implemented in hardware components known in the art.

Four receivers 110–113, four delay lines 115–118 and sixteen correlators 120–135 are shown in FIG. 3. With this receiving system, eight of the 32 pulses in the sync preamble are received and processed. This is due to the directionality of the antennas 101 and 102. Both antennas are not likely to receive a signal. Other implementations of a Link-16 receiving system may include eight receivers, eight delay lines and 32 correlators with each receiver tuned to one of the eight sync pulse frequencies to receive all 32 sync pulses in the sync preamble. Such a receiving system offers greater antijam performance during synchronization. The number of receivers and delay lines may be reduced to two with only eight pulses of the sync preamble received. This implementation will reduce the antijam performance during sync.

Figure 4:
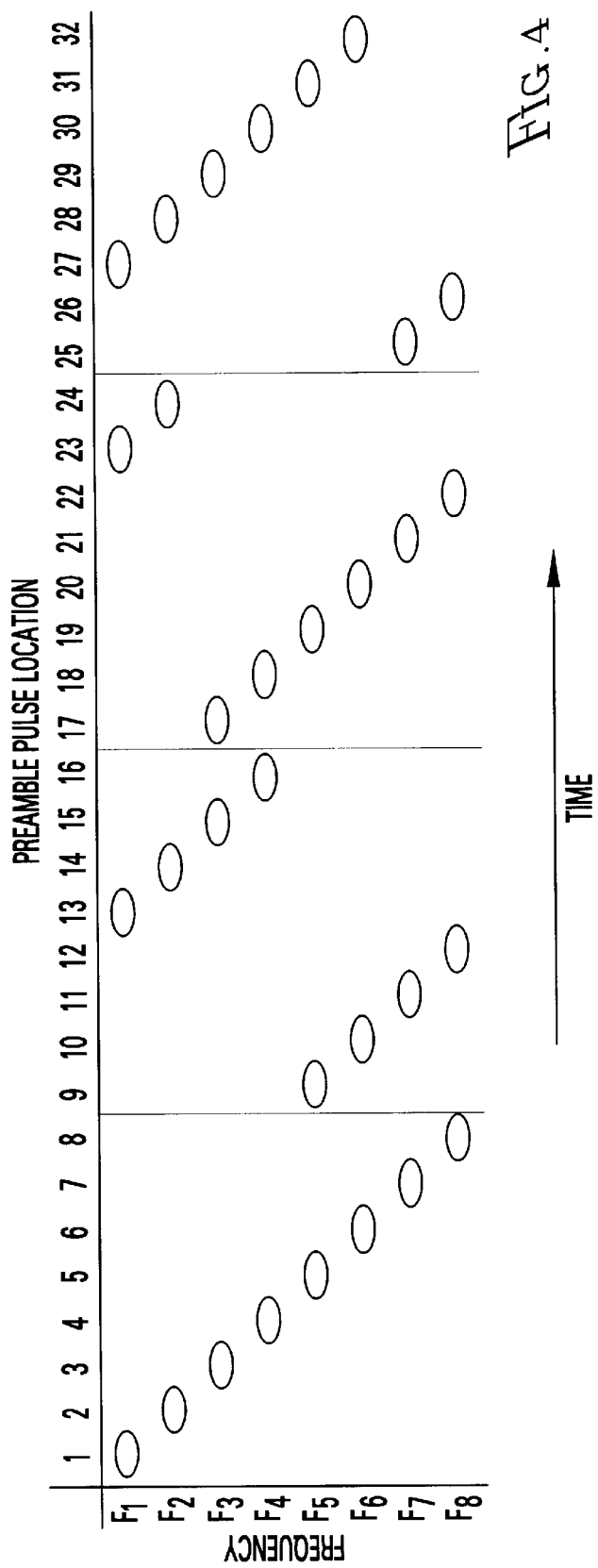
FIG. 4 is a diagram showing pulses in a synchronizing preamble of a JTIDS time slot as shown in FIG. 2.

An example of a Link-16 sync preamble showing the 32 sync pulses is shown in FIG. 4 with the pulses transmitted on eight frequencies as indicated down the left side of the chart. The pulse number is shown across the top of the chart. Each pulse is 6.4 microseconds in duration with 6.6 microseconds of off time for a total of 13 microseconds as shown in FIG. 2. The 32-pulse sync preamble has a total duration of 418 microseconds.

Each of the receivers 110-113 of FIG. 3 is tuned to one of the eight frequencies. For example, receiver 110 may be tuned to frequency 1 to receive pulse 1 followed by pulse 13, 23, and 27 in FIG. 4. Receiver 110 receives four pulses with different code words in each pulse all at frequency 1. Receiver 111 may be tuned to frequency 2 to receive pulse 2, 14, 24, and 28. Receiver 112 may be tuned to frequency 3 to receive pulses 3, 15, 17, and 29. Receiver 113 may be tuned to frequency 4 to receive pluses 4, 16, 18, and 30 as shown in FIG. 4.

When receiver 110 receives pulse 1 at frequency 1 and at the time as shown in FIG. 4, the receiver output containing the 32-bit code word is passed to the tapped delay line 115 in FIG. 3. The next three pulses 13, 23, and 27 received by receiver 110 are also passed to the tapped delay line in the order shown in FIG. 4 and with time delays between pulses as shown. The taps 115a, 115b, 115c, and 115d on the delay line 115 are made such that pulse 1 is delayed and present at tap 115a when delayed pulse 13 is present at tap 115b, delayed pulse 23 is present at tap 115c, and delayed pulse 27 is present at tap 115d. The other receivers 111–113 have their corresponding delay lines 116–118 and taps configured in a similar manner such the pulses received by each receiver simultaneously arrive at the delay line outputs.

The four pulses 1, 13, 23, and 27 received by receiver 110 and simultaneously present at the tapped delay line 115 outputs 115a–d are passed to pulse correlators 120–123 respectively as shown in FIG. 3. In the first correlator 120, the 32-bit code word received with pulse 1 is compared to a 32-bit reference code word for that pulse from the code generator 155. If the received code word for pulse 1 is completely aligned or in synchronization with the reference code word, the correlator 120 for pulse 1 has a maximum output. If the received code word for pulse 1 is not completely aligned or in synchronization with the reference code word, the correlator 120 for pulse 1 has a less than maximum output. The next pulse 13 received by receiver 110 is sent to the second correlator 121 for correlation simultaneously with the correlation process for pulse 1 occurring in correlator 120. This process is also occurring simultaneously with pulse 23 in the third correlator 122 and pulse 27 in the fourth correlator 123. This correlation process is repeated for all 16 pulses received by the four receivers 110–113 using 16 hardware correlators 120–135 in this example. The outputs of the correlators 120–135 are connected to the summing function 140. The summing function 140 adds the correlator outputs and passes the sum to a detector 145. The detector 145 determines if the sum exceeds a predetermined threshold. The detector 145 may be implemented in hardware components known in the art. If the predetermined threshold is met, synchronization is complete and the data following the sync preamble is received and processed in other functions (not shown) of the receiving system 100. If the predetermined threshold is not met, the receiving system continues operation and waits for the input data to correlate with the references to achieve synchronization. As can be seen this implementation of a receiver 100 is hardware intensive with 16 correlators and four receivers in this example.

Figure 5:
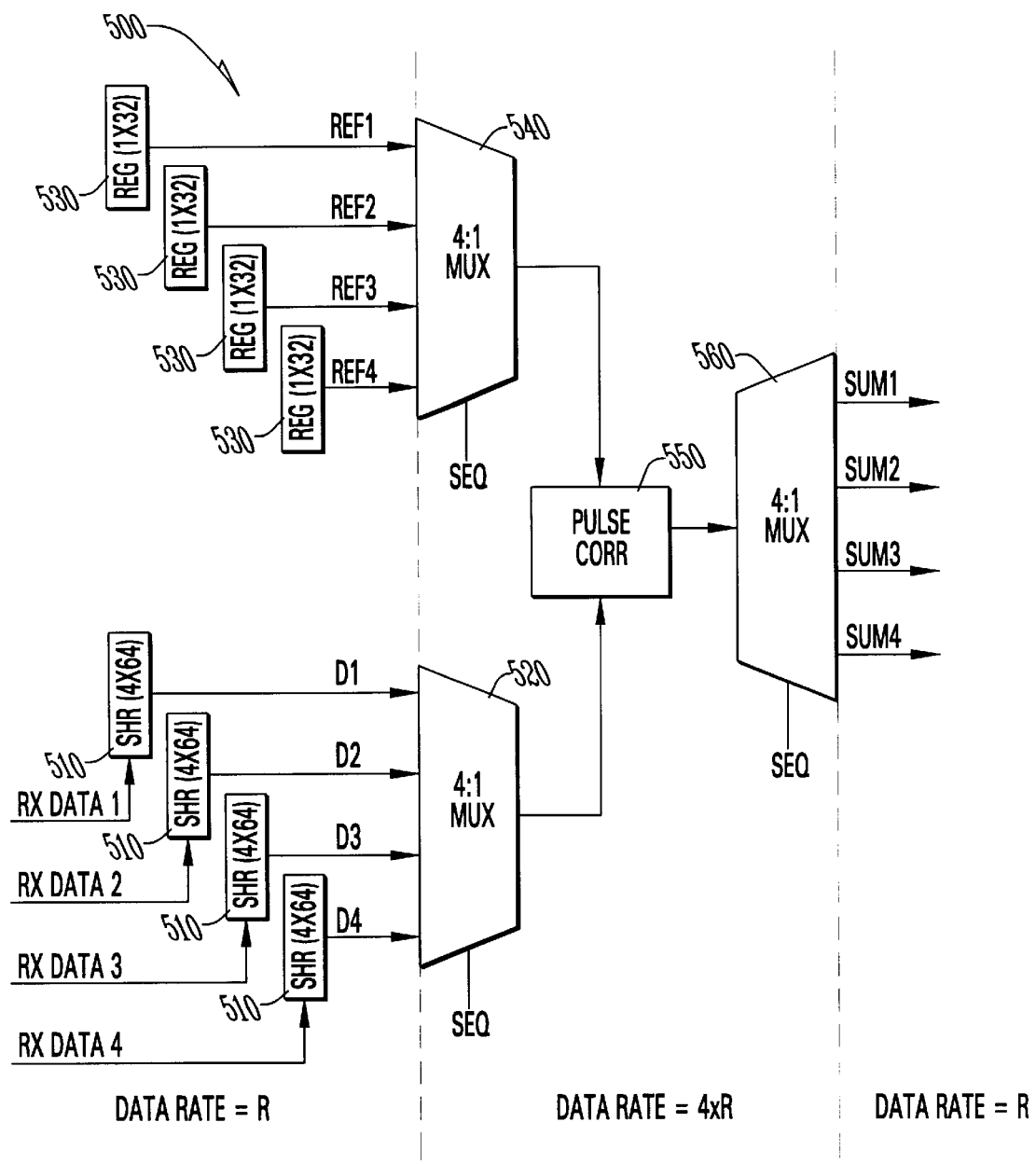
FIG. 5 is a block diagram showing a prior art time-shared correlator that may be used in the receiving system of FIG. 3.

Second generation Link-16 receiving systems utilize time-shared correlators operating at a higher clock frequency to reduce the number of correlators. An example of such a prior art correlator 500 is shown in FIG. 5. Correlator 500 in FIG. 5 may be substituted for the correlators 120–135 in FIG. 3. The correlator 500 uses time multiplexing to perform four correlation processes on four received pulses in this example. If 16 pulses are to be correlated as in FIG. 3, four correlators 500 must be used to replace the correlators 120–135. In FIG. 5 received data on lines Rx Data 1–4 is loaded into four shift registers 510. The received data may come from one of the four receivers 110–113 and delay lines 115–118 in FIG. 3 as described above. The received data on lines Rx Data 1–4 is the 32-bit code word and may be four bits wide. The receiver outputs may be I (in-phase) and Q (quadrature) outputs with two bits to represent each output. The shift registers 510 are 4-bits wide by 64-bits long due to two samples per bit of the 32 bits and may be any type known in the art suitable for this application. The received data code words are loaded into the shift registers 510 at a data rate R corresponding to the data rate used in FIG. 3 to load the correlators 120–135.

The outputs of the four shift registers 510 are connected to a 4:1 multiplexer 520 to select one of the four 32-bit code words on inputs Rx Data 1–4. The multiplexer 520 is switched sequentially at a rate four times the data rate R. The sequential switching may be preformed by the controller 114 in FIG. 3.

The 32-bit reference code words from the code generator 155 for each of the four received code words are loaded in four registers 530 in FIG. 5. The outputs of the four registers 530 are connected to another 4:1 multiplexer 540 to select one of the four 32-bit reference code words. The multiplexer 540 is also switched sequentially at a rate four times the data rate R. The sequential switching may be preformed by the controller 114 in FIG. 3. Multiplexer 520 and multiplexer 540 are switched at the same rate and in sequence such that the reference code word for the Rx Data 1 code is at the output of multiplexer 540 when the RX Data 1 code word is at the output of multiplexer 520.

The output of multiplexer 520 containing the 32-bit received code words and the output of multiplexer 540 containing the 32-bit reference code words are connected to a pulse correlator 550 where the two code words are compared as in the correlators 120–135 of FIG. 3. This correlation occurs at a clock rate four times the rate of the correlators 120–135 in FIG. 3.

The output of the pulse correlator 550 is connected to an output multiplexer 560. The output multiplexer 560 is sequentially switched along with multiplexers 520 and 540 under control of the controller 114 of FIG. 3 such that the output of the correlator 550 is switched to a sum 1 output of output multiplexer 560 when the correlator 550 is comparing the code words for reference 1 and RX Data 1. The sum outputs from the output multiplexer 560 may be connected to the summing function 140 of FIG. 3. The remainder of the circuit shown in FIG. 3 functions as before to correct for sync inaccuracies.

Figure 6:
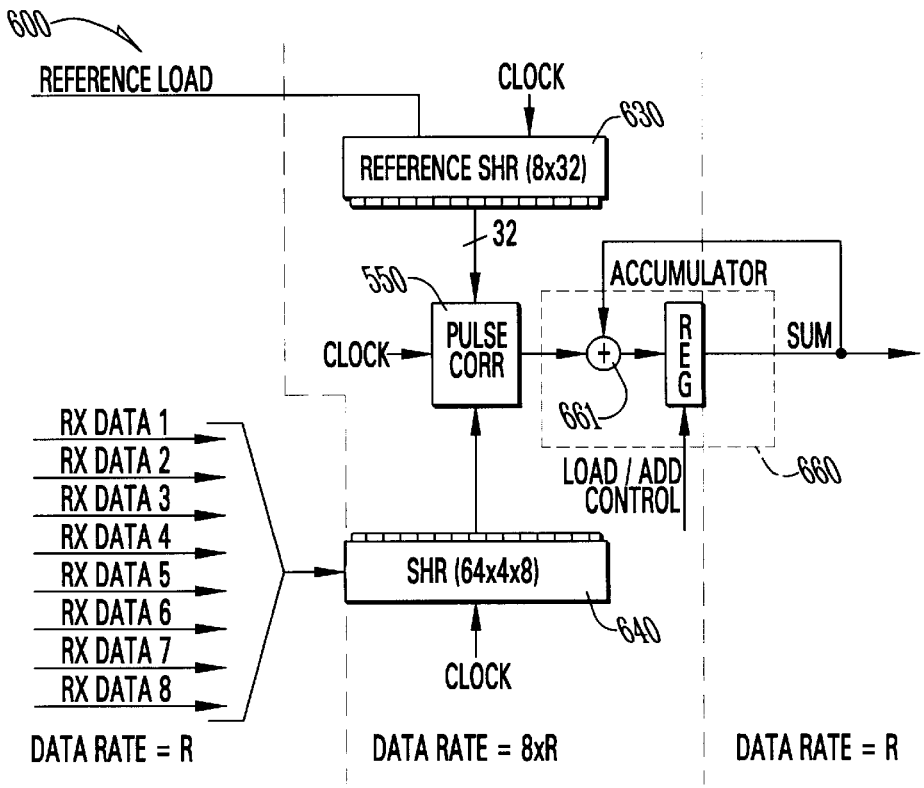
FIG. 6 is a block diagram an enhanced architecture time-shared data correlator in accordance with the present invention.

A time-shared correlator architecture 600 that allows a further reduction in gate count with a corresponding increase in maximum clock frequency in accordance with the present invention is shown in FIG. 6. The correlator 600 in FIG. 6 is shown in exemplary fashion as an eight correlation process correlator that may be utilized in the receiver system shown in FIG. 3 by substituting two correlator 600 systems for the correlators 120–135 to perform 16 correlation processes. The summing function 140 may also be replaced when using the time-shared correlator 600 of the present invention. The correlator 600 may be used in other configurations to perform a predetermined number of correlation processes of more or less than eight. In addition, the correlator 600 of the present invention may be used to correlate other input data and reference data than the code words used in the Link-16 receiving system of FIG. 3. The length of the code words is 32 bits in the receiving system of FIG. 3 but any number N of bits in the code word or data stream may be used.

In the correlator architecture 600 of FIG. 6, the 4-bit wide received data streams from two receivers 110–111 and delay lines 115 and 116 of FIG. 3 on data lines Rx Data 1 through Rx Data 8 is received at an input data rate R corresponding to the input data rate (R) used in FIG. 3. The eight data lines Rx Data 1–Rx Data 8 are connected to a data shift register 640. The enhanced architecture time-shared data correlator 600 must process the input data code words at eight times the input data rate to accomplish the correlation process. Therefore, the predetermined number of correlation processes must equal the multiple of the input data rate. The predetermined number of correlation processes equals the predetermined number of input sources, eight in this example.

Figure 7:
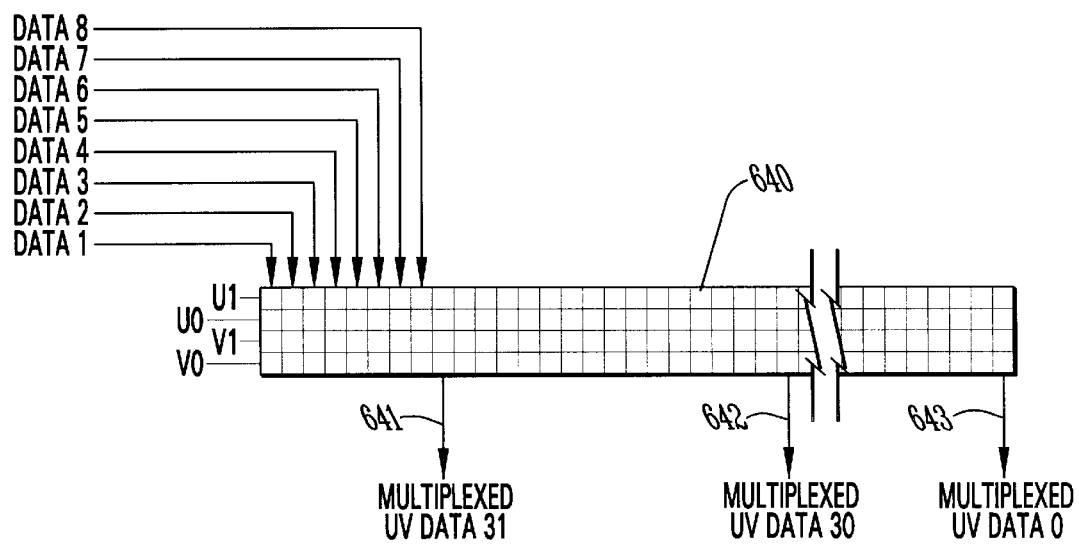
FIG. 7 is a block diagram of a data shift register of the data correlator of FIG. 6.

The data shift register 640 is shown in detail with the eight data input lines in FIG. 7. The data shift register must store the 64 samples of the 32-bit code word for each of the eight data input lines, so the data shift register must be a shift register that is 513 (0–512) stages long with 32 taps. The shift register 640 receives the individual input data code words from the received and delayed sync pulses in parallel and loads the data in the first eight stages. For example, the Rx Data 1 line loads the first bit of the 32 bit code word for received pulse 1 in FIG. 4 from delay line 15 tap 115*a* into a first stage 0 of the data shift register 640. The Rx Data 1 is four bits wide and the I data is loaded into U1 and U0 registers and the Q data is loaded into the V1 and V0 registers. Likewise, the first bit of Rx Data 2 is loaded into stage 1 of register 640 at the same time as stage 0 is loaded. Rx Data 2 is the 32-bit code word in pulse 13 at frequency 1 received by receiver 110 and present at tap 115b of delay line 115. The remaining data on lines Rx Data 3 through Rx Data 8 are loaded in a similar fashion simultaneously with the Rx Data 1 and the Rx Data 2. The input data is loaded at a rate R or in this example 10 MHz. The 32-bit code word is modulated at a 5-MHz chipping rate as previously discussed. The code word is sampled at a 10-MHz data rate resulting in two samples per bit. The data shift register 640 is clocked at a rate 8R or in this example 80 MHz. The eight input data samples are loaded simultaneously in the first eight stages of data shift register and then shifted at the 8R rate through the next eight stages. The next samples of the 32-bit code word for each of the eight data input lines (Rx Data 1–8) are loaded into the first eight stages and then shifted in a similar fashion along with the first eight samples. This loading of the data shift register 640 continues until detector 145 in FIG. 3 detects a sync. Multiplexed data for each of the 32 bits of each code word is available at the 32 taps three of which are shown for multiplexed UV data bit 0 (643), multiplexed data bit 30 (642), and multiplexed data bit 31 (641) in FIG. 7. The data in data shift register 640 is shifting at an 80 MHz rate and the 32 bits of data for each data input (Rx Data 1–8) becomes sequentially available at the 32 taps at this rate. The data at the 32 taps are in the four-bit wide format previously discussed in this example.

A reference shift register 630 in FIG. 6 is loaded with a predetermined number of reference data code words of length N, eight code words 32 bits long in this example, from the code generator 155 in FIG. 3. The eight reference data code words are loaded into the reference shift register 630 and circulated at eight times the input data rate (8R).

Figure 8:
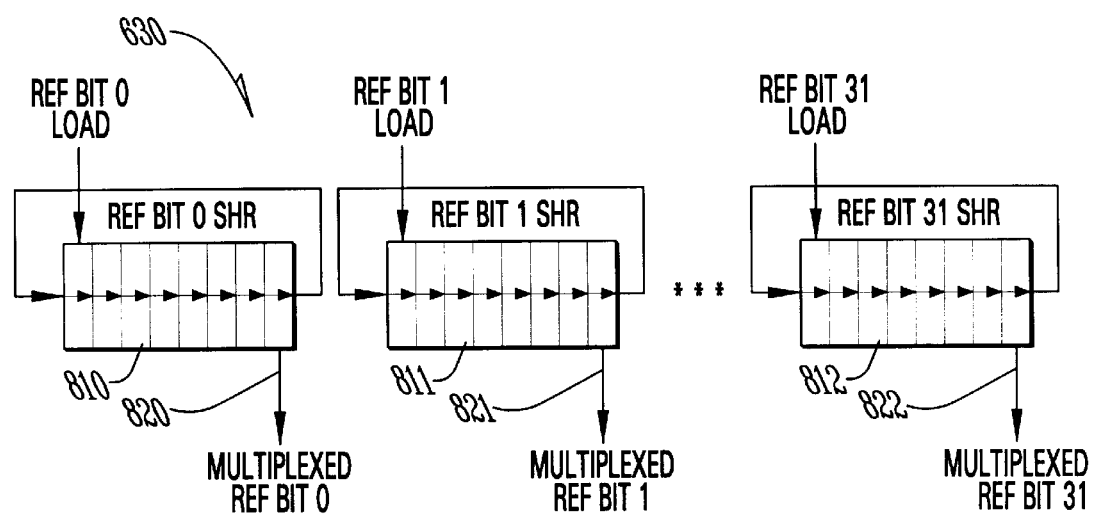
FIG. 8 is a block diagram of a reference shift register of the data correlator of FIG. 6.

The reference shift register 630 is shown in FIG. 8 in greater detail. The reference shift register comprises 32 (N=32) individual shift registers eight bits long. As shown in FIG. 8, a reference bit 0 for the first reference data code word is loaded into a reference bit 0 shift register 810. A reference bit 1 for the first reference data code word is loaded into a reference bit 1 shift register 811. A reference bit 31 for the first reference data code word is loaded into a reference bit 31 shift register 812. All the reference bits in between bit 1 and 31 are loaded in a similar fashion in registers not shown in FIG. 8. This loading of the 32-bit shift registers with the 32-bit code word occurs in parallel. All 32 reference bit shift registers are clocked at 8R or 80 MHz with the code words available at the input data rate R or 10 MHz in this example. The first reference code word is loaded and then shifted one stage of the eight stages in each of the 32 reference bit shift registers at the rate 8R. A second reference code word is loaded next with its 32 bits in the first stage of each of the 32 reference bit shift registers. The reference bit shift registers are then clocked again and the 32 bits of the first and second reference code words are shifted one stage in each register. This continues until the eight reference code words are loaded into the 32 reference bit shift registers. The outputs of the 32 reference bit shift registers are multiplexed reference bit outputs, three of which are shown in FIG. 8 as 820, 821, and 822. The 32 bits of each of the eight reference code words are sequentially available at these outputs.

A 32-bit pulse correlator 550 is connected to the shift register 640 and the reference shift register 630 for correlating an input data code word with its corresponding reference code word at a clock rate of eight times the input data rate (8R). The data shift register 640 and the reference shift register 630 are synchronized such that the reference code word and the input data code word are presented to the pulse correlator during the same clock cycle. The pulse correlator 550 provides a pulse correlator output indicating the level of correlation.

Figure 9A:
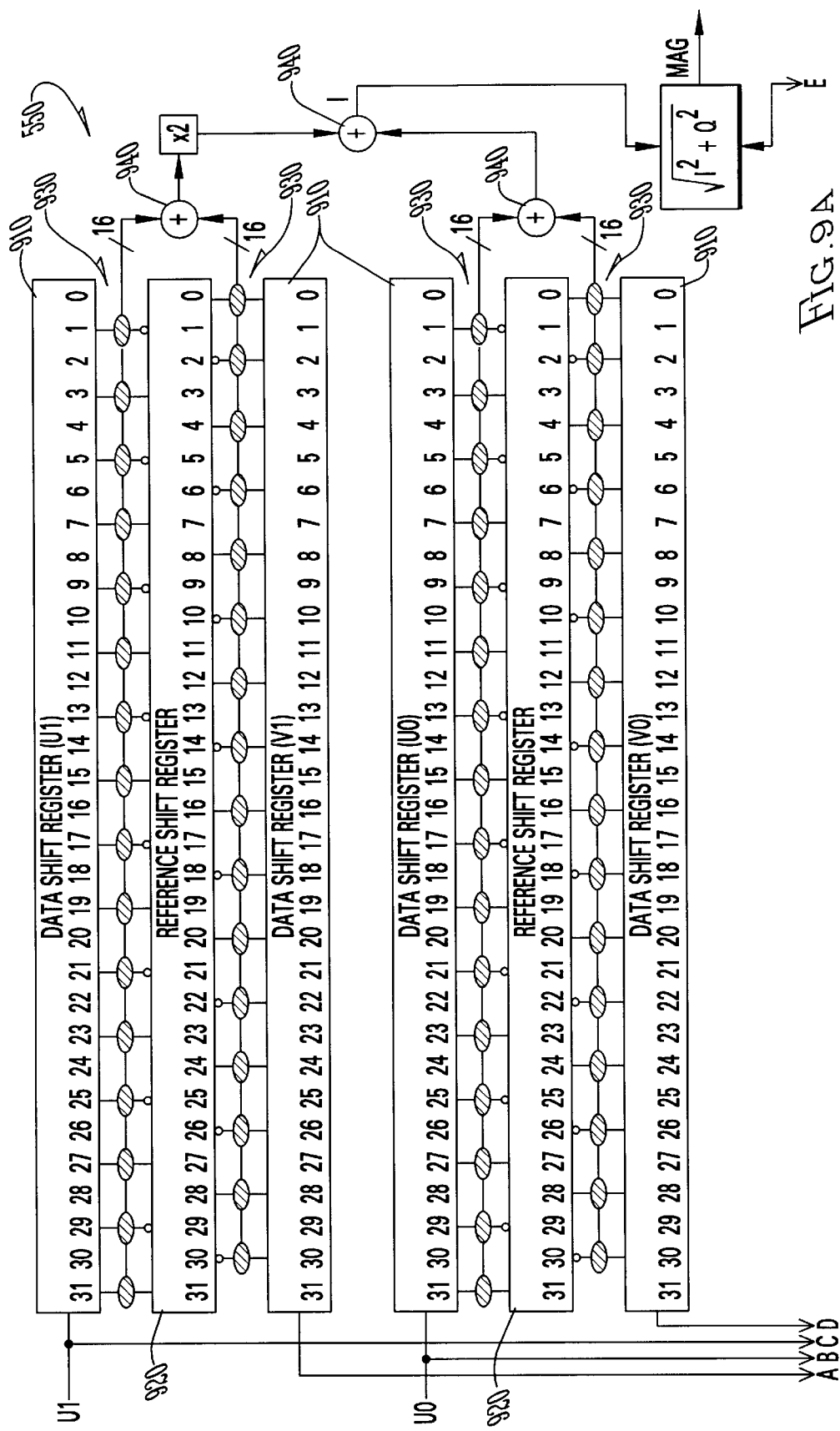
FIGS. 9A and 9B comprise a block diagram of a pulse correlator of the data correlator of FIG. 6.
Figure 9B:
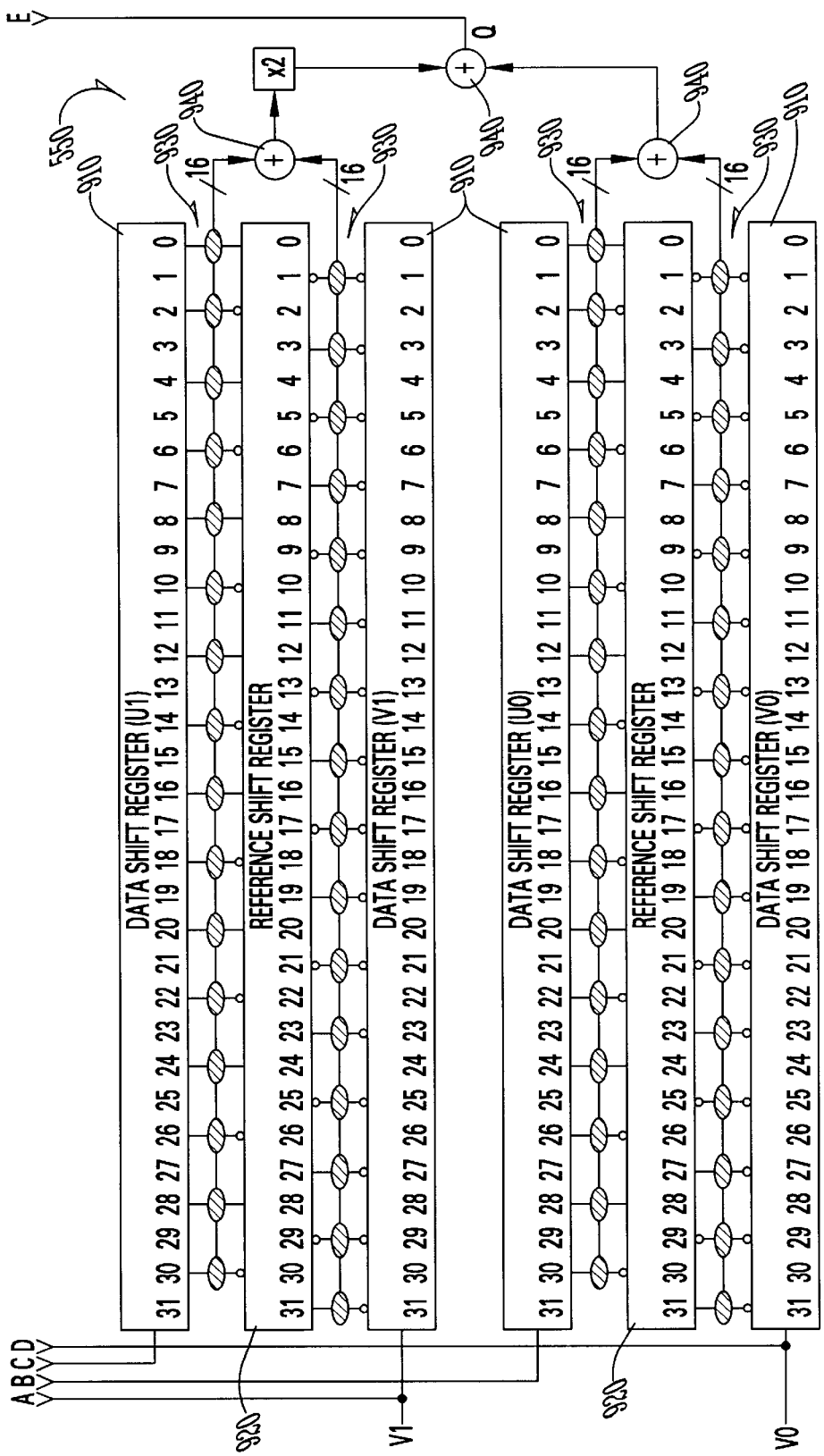

A detailed diagram of a typical pulse correlator 550 that may be used in the present invention is shown in FIGS. 9A and 9B. Pulse correlators are known in the art and other types of correlators may be used than the one shown herein. In the pulse correlator of FIGS. 9A and 9B, the four bit wide data input is loaded on inputs U1, U0, V1, and V0 from the data shift register 640 into the pulse correlator 550. The four input lines are connected to eight data shift registers 910. The reference code word for the input code word is loaded into four reference shift registers 920 each of which are 32 bits long. The comparison of the input code word and the reference code word occurs in exclusive OR gates with inverted outputs (XNOR gates) 930 as shown by the plurality of ovals. The XNOR gates 930 are interconnected as shown to the data shift registers 910 and the reference shift registers 920. Each of the XNOR gates 930 is interconnected to each other in a bank with the end XNOR gate 930 providing a correlation sum output. Pairs of outputs from the XNOR gate banks are summed in summers 940 with the summed pairs again summed in additional summers 940 to form the I and Q correlator outputs. A magnitude network 950 performs an absolute value determination on the I and Q outputs resulting in the correlator 550 output for the correlation of the data word and its corresponding reference. This correlation operation is repeated in the correlator 550 for each of the eight input data code words with its corresponding reference code word as described in conjunction with FIG. 6.

Returning to FIG. 6, the output of the pulse correlator 550 is connected to an accumulator 660. The accumulator 660 receives the pulse correlator output signal for each of the eight correlation processes performed in the pulse correlator 550 and adds them together. The pulse correlator output is connected to an adder 661 and the adder output is connected to a register 662 in the accumulator 660. The register 662 output is fed back to the adder 661. The correlator 600 output is taken from the accumulator 660. In operation the pulse correlator 550 output is received by the adder 661 and added to any data in the register 662 by the adder 661. The adder 661 output is then loaded into the register 662. When the next pulse correlator 550 output appears the register 662 output is added to it. This process is controlled under a load/add control input at eight times the input data rate (8R) and in sync with the pulse correlator 550.

The enhanced architecture time-shared data correlator 600 of the present invention shown in FIG. 6 results in an approximate 14% reduction in gate count over the correlator 500 shown in FIG. 5 for a 10-MHz correlation system and 20% for a 5-MHz correlation system.

It is believed that the enhanced architecture time-shared data correlator of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An enhanced architecture time-shared data correlator for performing a predetermined number of correlation processes comprising:

a data shift register having a predetermined number of input lines for receiving a predetermined number of input data code words of length N at an input data rate and loading the input data code words at a multiple of the input data rate;

a reference shift register for receiving a predetermined number of reference data code words of length N and loading the reference data code words at the multiple of the input data rate;

a pulse correlator of length N connected to the data shift register and the reference shift register for correlating each of the predetermined number of input data code word with its corresponding reference data code word at the multiple of the input data rate to provide a predetermined number of pulse correlator outputs; and an accumulator connected to the pulse correlator for receiving and adding the predetermined number of pulse correlator outputs in accordance with a load/add control signal at a multiple of the input data rate to provide a correlator output.

2. The enhanced architecture time-shared data correlator of claim 1 wherein the predetermined number of correlation processes equals the predetermined number of input data code words.

3. The enhanced architecture time-shared data correlator of claim 1 wherein the predetermined number of correlation processes equals the multiple of the input data rate.

4. The enhanced architecture time-shared data correlator of claim 1 wherein the predetermined number of correlation processes equals to the predetermined number of reference data code words.

5. The enhanced architecture time-shared data correlator of claim 1 wherein the data shift register further comprises a shift register of length 2N times the predetermined number of correlation processes.

6. The enhanced architecture time-shared data correlator of claim 1 wherein the reference shift register further comprises N individual shift registers of a length equal to the predetermined number of correlation processes.

7. A method of performing a predetermined number of correlation processes in an enhanced architecture time-shared data correlator comprising the steps of:

receiving a predetermined number of input data code words at an input data rate at a data shift register;

loading into the data shift register the predetermined number of input data code words at a multiple of the input data rate;

loading into a reference shift register a predetermined number of reference data code words;

circulating the reference data code words in the reference shift register at the multiple of the input data rate;

correlating each of the predetermined number of input data code words with its corresponding reference data code word in a pulse correlator connected to the data shift register and the reference shift register at a multiple of the input data rate;

providing a pulse correlator output from the pulse correlator for each of the correlation steps;

receiving at an accumulator connected to the pulse correlator the pulse correlator outputs;

adding the pulse correlator outputs in the accumulator; and providing a correlator output that is a sum of the pulse correlator outputs for the correlation of each of the input data code words and its corresponding reference code word.

8. The method of performing the predetermined number of correlation processes in an enhanced architecture time-shared data correlator of claim 7 wherein the predetermined number of correlation processes corresponds to the predetermined number of input data code words.

9. The method of performing the predetermined number of correlation processes in an enhanced architecture time-shared data correlator of claim 7 wherein the predetermined number of correlation processes equals the multiple of the input data rate.

10. The method of performing the predetermined number of correlation processes in an enhanced architecture time-shared data correlator of claim 7 wherein the predetermined number of correlation processes equals the predetermined number of reference data code words.

11. An enhanced architecture time-shared data correlator for performing a predetermined number of correlation processes comprising:

a data shift register for receiving and loading a predetermined number of input data;

a reference shift register for sequentially receiving reference data and loading and circulating the reference data;

a pulse correlator connected to the data shift register and the reference shift register for correlating the input data with corresponding reference data and providing a pulse correlator output; and an accumulator connected to the pulse correlator for receiving and adding the pulse correlator outputs to provide a correlator output.

12. The enhanced architecture time-shared data correlator of claim 11 wherein the data shift register comprises a predetermined number of input lines for receiving input data code words of length N at an input data rate and for loading the input data code words at a multiple of the input data rate.

13. The enhanced architecture time-shared data correlator of claim 12 wherein the data shift register further comprises a predetermined number of shift register stages for loading and circulating the input data at the multiple of the input data rate.

14. The enhanced architecture time-shared data correlator of claim 12 wherein the reference shift register further comprises N individual shift registers of a length equal to the predetermined number of correlation processes said N individual shift registers for receiving reference data and loading and circulating the reference data at a multiple of the input data rate.

* * * * *